United States Patent
Wang

(10) Patent No.: US 12,440,453 B2
(45) Date of Patent: *Oct. 14, 2025

(54) INTRAARTERIAL (IA) APPLICATION OF LOW DOSE OF ETHYL ALCOHOL ENABLES BLOOD-BRAIN BARRIER (BBB) IMPERMEABLE THERAPEUTICS BRAIN ENTRY

(71) Applicant: Weijun Wang, Cypress, CA (US)

(72) Inventor: Weijun Wang, Cypress, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/689,969

(22) Filed: Mar. 8, 2022

(65) Prior Publication Data

US 2022/0287986 A1  Sep. 15, 2022

Related U.S. Application Data

(60) Provisional application No. 63/159,078, filed on Mar. 10, 2021.

(51) Int. Cl.
| | |
|---|---|
| *A61K 31/045* | (2006.01) |
| *A61K 9/00* | (2006.01) |
| *A61K 45/06* | (2006.01) |
| *A61M 37/00* | (2006.01) |

(52) U.S. Cl.
CPC .......... *A61K 31/045* (2013.01); *A61K 9/0019* (2013.01); *A61K 45/06* (2013.01); *A61M 37/0092* (2013.01)

(58) Field of Classification Search
CPC .... A61K 31/045; A61K 9/0019; A61K 45/06; A61K 31/704; A61M 37/0092
See application file for complete search history.

(56) References Cited

FOREIGN PATENT DOCUMENTS

WO   WO2019/157195 A1 *   8/2019   ........... A61K 31/045

OTHER PUBLICATIONS

William M. Pardridge. Blood-brain barrier delivery, Drug Discovery Today, vol. 12, Issues 1-2 (2007) 54-61 (Year: 2007).*
Haorah, J., Heilman, D., Knipe, B. et al. Ethanol-induced activation of myosin light chain kinase leads to dysfunction of tight junctions and blood-brain barrier compromise. Alcoholism, Clinical and Experimental Research (2009) 29, 999-1009 (Year: 2009).*
Takeda, N., Diksic, M. Relationship Between Drug Delivery and the Intra-arterial Infusion Rate of SarCNU in C6 Rat Brain Tumor Model. J Neurooncol. (1999) 41, 235-246 (Year: 1999).*

* cited by examiner

*Primary Examiner* — Joseph K McKane
*Assistant Examiner* — David M Shim
(74) *Attorney, Agent, or Firm* — Novoclaims Patent Services LLC; Mei Lin Wong

(57) ABSTRACT

A method of inducing blood-brain barrier (BBB) opening of for delivery of a non-BBB permeable substance to a subject includes the steps of: administering an ethyl alcohol at 0.015%-5% v/v into a blood stream of the subject via intra-arterial injection, intracardiac injection, or intra-arterial injection guided by ultrasound, wherein said ethyl alcohol reaches a brain of the subject to induce opening of blood-brain barrier so that the non-BBB permeable substance is capable of penetrating the blood-brain barrier to reach the brain of the subject. The non-BBB substance includes a therapeutic agent, a diagnostic agent, or a prophylactic agent. The use of low concentration of ethyl alcohol can induce a temporary BBB opening within 240 minutes after administration so that the non-BBB substance can be deliver to the brain during the time frame of BBB opening. Since ethyl alcohol is water soluble, the non-BBB substance can also be administered concurrently.

18 Claims, 5 Drawing Sheets

IA NEO100 treated brains

| Normal Brain | IA 5%NEO100 | IA 3%NEO100 | IA 0.3%NEO100 | IA 0.1%NEO100 |
|---|---|---|---|---|
| | | | | |

IA ethyl alcohol treated brains

| Normal Brain | IA 5%Ethanol | IA 3%ethyl alcohol | IA 0.3%ethyl alcohol | IA 0.1%ethyl alcohol |
|---|---|---|---|---|
| | | | | |

IA mannitol treated brains

| Normal Brain | IA 5%mannitol | IA 3%mannitol | IA 0.3%mannitol | IA 0.1%mannitol |
|---|---|---|---|---|
| | | | | |

FIG. 2

INTRAARTERIAL (IA) APPLICATION OF LOW DOSE OF ETHYL ALCOHOL ENABLES BLOOD-BRAIN BARRIER (BBB) IMPERMEABLE THERAPEUTICS BRAIN ENTRY

CROSS REFERENCE OF RELATED APPLICATION

This is a non-provisional patent application of U.S. provisional patent application No. 63/159,078, filed Mar. 10, 2021, which is incorporated herein by reference in their entirety.

BACKGROUND OF THE PRESENT INVENTION

Field of Invention

The present invention relates to opening of the blood-brain barrier, and more particularly to a method of opening blood-brain barrier by low dose ethyl alcohol and its applications thereof.

Description of Related Arts

Blood-brain barrier (BBB) is a dynamic biologic interface that controls the exchange of substances between the blood and the central nervous system (CNS). The structural and functional integrity of the BBB is vital for the maintenance of homeostasis in the CNS. However, it impedes the entry of drugs into the CNS and prevents many potent pharmaceutical agents from exerting substantial therapeutic activity against CNS disorders and brain-related malignancies.

Since the concept of osmotic BBB opening was introduced in 1972, the hyperosmotic mannitol has been used in the clinic for decades as a vehicle to transiently open BBB to deliver the medications into the brain. Mannitol has a chemical formula $C_6H_{14}O_6$ and a chemical structure as follows:

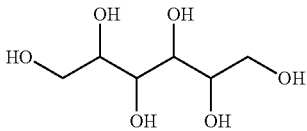 [SMILES: OCC(O)C(O)C(O)C(O)CO]

Currently, BBB disruption via rapid intraarterial (IA) infusion of hyperosmolar mannitol represents the main clinical method to obtain a transient BBB opening. However, the fluctuations in BBB disruption obtained with mannitol may lead to subsequent fluctuating concentrations of drugs in the cerebrospinal fluid. Also, intraarterial (IA) mannitol may have a negative impact on the regional delivery of therapeutics, along with unpredictable adverse effects, such as seizures, risks of brain embolism, catastrophic bleeds, and even fatal brain edema. Accordingly, BBB disruption via rapid intraarterial (IA) infusion of hyperosmolar mannitol represents an unreliable technique. There is an urgent medical need in the current medical practice to obtain a novel approach to a transient BBB permeabilization effect in drug delivery in a safe and controlled manner.

Another compound which are studied for transient BBB disruption is NEO100. NEO100 is a highly concentrated, cGMP-manufactured version of perillyl alcohol (POH) and is a naturally occurring monoterpene related to limonene that is present in the essential oils of citrus fruits and other botanicals, such as sage, peppermint, cherries, and celery seeds. NEO100 has a chemical formula $C_{10}H_{16}O$ and a chemical structure as follows:

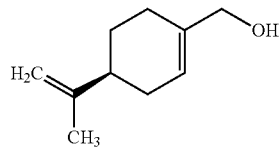

NEO100 showed a great potential to open BBB when applied by intraarterial injection. But the major problem is that NEO100 is a lipophilic compound, there is no good solvent to dissolve NEO100 to the desired concentration. NEO100 mediated BBB opening is a patchy uneven distribution of extravasated EB dye based on where the NEO100 delivered randomly inside the cerebral arteries. Therefore, NEO100 cause a sporadic pattern depends on where NEO100 goes. Therefore, NEO100 also fails to provide a controllable and safe transport mechanism to deliver therapeutics to the brain for the treatment of diseases).

Patients with brain tumors or brain metastasis are treated with multi-disciplinary approaches. The non-BBB permeable characteristics make it incapable of reaching an equivalent therapeutic efficacy in brain metastases as that achieved in the case of systemic malignancies. This pattern of failure has mainly been attributed to the lack of penetration of therapeutics to the CNS.

Different strategies have been tried, such as intracranial (intracerebroventricular, intraparenchymal, and intrathecal) administration; intranasal delivery; the ultrasound-induced opening of the BBB; and even BBB disruption via rapid intracarotid infusion of a hyperosmolar mannitol solution, etc. Nowadays, IA infusion of hyperosmotic mannitol represents the main clinical method to induce a transient BBB opening. However, the fluctuations in BBB opening mediated by mannitol have a negative impact on the regional delivery of therapeutics, along with unpredictable adverse effects, i.e., seizures, brain embolism, catastrophic bleeds, and even fatal brain edema.

Therefore, there is an urgent medical need to improve the transportation of BBB impermeable therapeutics into the central nervous system (CNS), which is generally impeded by the blood-brain barrier (BBB).

Because of the presence of BBB, it is very challenging if not possible to solve the problems in relation to the delivery of a therapeutic, diagnostic, or prophylactic agent into the brain of a subject, the delivery of an antibody or antibody fragment into the brain of a subject, or providing a pharmaceutical composition to the brain of the subject.

SUMMARY OF THE PRESENT INVENTION

An object of the present invention is to provide a method of inducing an immediate, efficient, reversible, and safe BBB opening for facilitating a brain distribution of non-BBB permeable therapeutics of different sizes, thereby drug delivery of therapeutics to target brain malignancies and CNS disorders in a controlled and safe manner can be achieved.

Another object of the present invention is to provide a method of opening blood-brain barrier in a safe and controllable manner so that a transient BBB permeabilization effect can be achieved for delivering impermeable therapeutics, such as therapeutics to target brain malignancies and CNS disorders, into the central nervous system.

Another object of the present invention is to provide a method of delivery of a therapeutic, diagnostic, or prophylactic agent into the brain of a subject in a controllable manner.

Another object of the present invention is to provide a method of delivery an antibody or antibody fragment into the brain of a subject in a controllable manner.

According to a preferred embodiment of the present invention, a method of inducing blood-brain barrier (BBB) opening of for delivery of a non-BBB permeable substance to a subject, comprises the steps of: administering an ethyl alcohol at 0.015%-5% v/v into a blood stream of the subject via intra-arterial injection, intracardiac injection, or intra-arterial injection guided by ultrasound, wherein said ethyl alcohol reaches a brain of the subject to induce opening of blood-brain barrier so that the non-BBB permeable substance is capable of penetrating the blood-brain barrier to reach the brain of the subject. The non-BBB substance comprises a therapeutic agent, a diagnostic agent, or a prophylactic agent, and is administered to the subject before, at the same time with, or within 120 minutes after the ethyl alcohol is administered to the subject.

The ethyl alcohol can reduce level of quantified tight junction proteins for a time frame of about 240 minutes immediately after the ethyl alcohol is administered to the subject. The concentration of the ethyl alcohol can be adjusted by using USP purified water. When the ethyl alcohol is administered through a left side intraarterial catheter placement, the non-BBB substance can be delivered mainly to the left side of the brain.

When the ethyl alcohol is administered, an infusion flow rate of intra-arterial injection or intracardiac injection is about 5-7 µl/second (0.3-0.45 ml/min) and an infusion volume is about 10% of a body weight (at 1 µl/g, volume/weight ratio) of the subject The non-BBB substance is selected from the one or more of the followings: a small molecular tracer, Evans blue dye, a cancer therapeutic agent, doxorubicin, an antibody, an antibody fragment, Trastuzumab, a check point inhibitor, an anti-PD1 antibody or a PD1-binding fragment thereof, a monoclonal antibody, a peptide, a growth factor, a cytokine, and an enzyme.

The non-BBB substance can also be selected from the one or more of the followings: Trastuzumab, Alemtuzumab, Atezolizumab, Avelumab, Bevacizumab, Blinatumomab, Brentuximab vedotin, Cemiplimab, Cetuximab, Daclizumab, Daratumumab, Dinutuximab, Durvalumab, Edrecolomab, Elotuzumab, Enfortumab vedotin, Eptinezumab, Erenumab, Fremanezumab, Galcanezumab, Gemtuzumab ozogamicin, Ibritumomab tiuxetan, Idarucizumab, Inotuzumab ozogamicin, Ipilimumab, Isatuximab, Natalizumab, Nebacumab, Necitumumab, Nivolumab, Obinutuzumab, Ocrelizumab, Ofatumumab, Olaratumab, Panitumumab, Pembrolizumab, Pertuzumab, Polatuzumab vedotin, Ramucirumab, Rituximab, Sacituzumab govitecan Tafasitamab, Tositumomab-1131, and an anti-PD-1 antibody.

According to another aspect of the present invention, a preferred embodiment of the present invention provides a method for delivery of a therapeutic agent, a diagnostic agent, or a prophylactic agent into the brain of a subject, which comprises the following steps:

administering an effective amount of 0.01%-3% ethyl alcohol into a blood stream of the subject; and administering an effective amount of the therapeutic agent, the diagnostic agent, or the prophylactic agent before, concurrently or within 240 minutes after the ethyl alcohol is administered, wherein said ethyl alcohol reaches a brain of the subject to induce opening of blood-brain barrier so that the of the therapeutic agent, the diagnostic agent, or the prophylactic agent penetrates the blood-brain barrier to reach the brain of the subject.

The ethyl alcohol reduces level of quantified tight junction proteins in the blood brain barrier for a time frame of at least 120 minutes immediately after the ethyl alcohol is administered to the subject. The concentration of said ethyl alcohol is adjusted by using purified water.

Preferably, the ethyl alcohol is administered via intra-arterial injection or intracardiac injection, an infusion flow rate of intra-arterial injection or intracardiac injection is about 5-7 µl/second (0.3-0.45 ml/min) and an infusion volume is about 10% of a body weight (at 1 µl/g, volume/weight ratio) of the subject.

The therapeutic agent, the diagnostic agent, or the prophylactic agent is one or more of: a small molecular tracer, Evans blue dye, a cancer therapeutic agent, doxorubicin, an antibody, an antibody fragment, Trastuzumab, a check point inhibitor, an anti-PD1 antibody or a PD1-binding fragment thereof, a monoclonal antibody, a peptide, a growth factor, a cytokine, and an enzyme.

The therapeutic agent, the diagnostic agent, or the prophylactic agent can also be one or more of: Trastuzumab, Alemtuzumab, Atezolizumab, Avelumab, Bevacizumab, Blinatumomab, Brentuximab vedotin, Cemiplimab, Cetuximab, Daclizumab, Daratumumab, Dinutuximab, Durvalumab, Edrecolomab, Elotuzumab, Enfortumab vedotin, Eptinezumab, Erenumab, Fremanezumab, Galcanezumab, Gemtuzumab ozogamicin, Ibritumomab tiuxetan, Idarucizumab, Inotuzumab ozogamicin, Ipilimumab, Isatuximab, Natalizumab, Nebacumab, Necitumumab, Nivolumab, Obinutuzumab, Ocrelizumab, Ofatumumab, Olaratumab, Panitumumab, Pembrolizumab, Pertuzumab, Polatuzumab vedotin, Ramucirumab, Rituximab, Sacituzumab govitecan Tafasitamab, Tositumomab-1131, and an anti-PD-1 antibody.

Compared to Mannitol and NEO100, the use of IA ethyl alcohol mediated BBB opening according to the present invention has the following advantageous effect:

Ethyl alcohol is a small molecule that can be easily produced;

Ethyl alcohol can be easily produced under CMC (chemical manufacturer control).

Ethyl alcohol has long been used by human beings for centuries in every corner of the world. Thus, the GMP grade and USP grade of ethyl alcohol can be easily produced.

Because of its infinitely soluble (fully miscible) in water, ethyl alcohol can be easily diluted into any lower concentration as desired. Also, ethyl alcohol demonstrated a more predictable and reliable result to induce BBB opening.

To limit the extent of opened BBB, ethyl alcohol can be manipulated via an intraarterial catheter to lead to a localized BBB (a segment of a cerebral artery) opening.

Ethyl alcohol can cause a homogeneous BBB opening. This will be more advantageous than the NEO100 induced breath of BBB.

To decrease the requirements of certain variables of BBB opening mediated by IA ethyl alcohol compared to IA mannitol due to multiple factors that may interfere with its efficacy. The variables include the volume applied, the speed of injection, the temperature of mannitol applied, etc.

BRIEF DESCRIPTION OF THE DRAWINGS

FIG. 2 illustrates the photos of treated brains after IA ethyl alcohol, mannitol, and NEO100 with Evans Blue dye at various concentrations.

DETAILED DESCRIPTION OF THE PREFERRED EMBODIMENT

According to preferred embodiment of the present invention, a method of inducing an immediate, efficient, reversible, and safe blood-brain barrier (BBB) opening for facilitating a brain distribution of non-blood-brain barrier (non-BBB) permeable therapeutics of different sizes comprises the steps of:

administering a composition comprising an effective amount of ethyl alcohol into the blood stream of the subject intraarterially.

Figure 1:
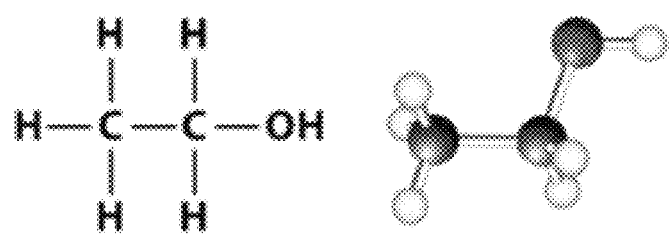
FIG. 1 illustrates the chemical structure of ethyl alcohol according to the present invention.

The ethyl alcohol, having a chemical formula $C_2H_5OH$ and a chemical structure as shown in FIG. 1 of the drawings.

The molar mass of ethyl alcohol is 46.07.

Ethyl alcohol can mediate an immediate and efficient BBB opening when it is applied intraarterially. The disrupted BBB allows for non-BBB permeable substances extravasated from the circulation into the brain parenchyma, ranging from small molecular tracer, such as Evans blue (EB) dye, cancer therapeutic agent, and Doxorubicin, to large molecule antibodies, such as Trastuzumab, which has been broadly applied for the treatment of HER2 overexpressing breast cancer brain metastasis; and the check point inhibitor, anti-PD1 (Programed Death) antibody brain entry as well.

The working concentration range of ethyl alcohol which can be applied intraarterially is 0.015-5.0% (v/v, in bacteriostatic sterile water, ID, DRR784, USP, Hospira, Inc. Lake Forest, IL USA). Only if diluted and lowered to a specific low concentration, then ethyl alcohol acts as a vector to induce BBB opening for non-BBB permeable therapeutics brain entry.

Due to the properties of ethyl alcohol, the ethyl alcohol can be diluted by using bacteriostatic water for injection, USP. Bacteriostatic water for injection, USP is a sterile, nonpyrogenic preparation of water for injection containing 0.9% (9 mg/mL) of benzyl alcohol added as a bacteriostatic preservative. (USP is an indication that the product follows the United States Pharmacopeia standard).

Due to the characteristic of small molecules and its infinitely soluble (fully miscible) in water, ethyl alcohol can be prepared into any desire working concentration. Also, ethyl alcohol per se is a super powerful agent to disrupt the BBB even at a very low concentration, i.e., at 0.01%. On the other hand, ethyl alcohol has been living with human beings for years, decades, and even centuries due to its beneficial effects. In other words, ethyl alcohol is a very safe composition for use.

Compared to Mannitol and NEO100, ethyl alcohol induces an immediate, efficient, reversible, and safe BBB opening in mice. IA ethyl alcohol-mediated BBB permeabilization facilitates the brain distribution of non-BBB permeable therapeutics of different sizes, including the extravasation of Evans blue (EB) dye, and large molecule antibody, Trastuzumab. IA ethyl alcohol could cause a positive revolutionary impact on drug delivery of therapeutics to target brain malignancies and CNS disorders.

According to another preferred embodiment of the present invention, a method for delivery of a therapeutic, diagnostic, or prophylactic agent into the brain of a subject, comprising the steps of:

administering a composition comprising an effective amount of ethyl alcohol into the blood stream of the subject, wherein the therapeutic, diagnostic, or prophylactic agent is extravasated from the blood stream into the brain or central nervous system (CNS) of the subject.

Preferably, the method further comprises the step of: administering the therapeutic, diagnostic, or prophylactic agent into the blood stream of the subject.

Preferably, the therapeutic, diagnostic, or prophylactic agent is administered before or concurrently with the composition comprising the ethyl alcohol. The therapeutic, diagnostic, or prophylactic agent is administered within 15 minutes, 60 minutes, 120 minutes, or 240 minutes following the administration of the composition comprising the ethyl alcohol.

The subject has been administered the therapeutic, diagnostic, or prophylactic agent into or to reach the blood stream, or the therapeutic, diagnostic, or prophylactic agent is a pre-existing blood-borne agent in the subject.

The composition comprises ethyl alcohol at 0.015%-5% v/v. Preferably, the composition comprises ethyl alcohol at 0.01%-0.1% v/v, 0.1%-0.5% v/v, 0.5%-1% v/v, 1%-2% v/v, 2%-3% v/v, 3%-4% v/v, or 4%-5% v/v.

The composition comprises the ethyl alcohol and a pharmaceutically acceptable carrier, wherein the pharmaceutically acceptable carrier comprises bacteriostatic water, an aqueous solution containing sodium chloride, or water.

The composition is administered intra-arterially, or via intracardiac injection, optionally via left ventricle or guided by ultrasound.

Alternately, the composition is administered via an intraarterial catheter, optionally placed via carotid artery.

Alternately, the composition comprising the ethyl alcohol is administered to a segment of a cerebral artery, thereby delivering the therapeutic, diagnostic, or prophylactic agent into a portion of the brain around the segment.

The therapeutic, diagnostic, or prophylactic agent is impermeable or does not extravasate across a blood brain barrier in a control subject that has not been administered with a composition comprising the ethyl alcohol.

The therapeutic, diagnostic, or prophylactic agent comprises a small molecular tracer, Evans blue dye, a cancer therapeutic agent, doxorubicin, an antibody, an antibody fragment, Trastuzumab, a check point inhibitor, an anti-PD1 antibody or a PD1-binding fragment thereof, a monoclonal antibody, a peptide, a growth factor, a cytokine, an enzyme, or a combination thereof.

The composition does not include mannitol, perillyl alcohol, or both.

The subject is diagnosed with, or suffers from, a brain tumor, brain metastasis, brain malignancy, or a CNS disorder.

The subject has an adverse effect to intra-arterially administered mannitol.

According to another preferred embodiment of the present invention, a method for delivery of an antibody or antibody fragment into the brain of a subject, comprising: administering a composition comprising an effective amount of ethyl alcohol and an effective amount of the antibody or antibody fragment in the blood stream of the subject, wherein the antibody or antibody fragment is extravasated from the blood stream into the brain or central nervous system (CNS) of the subject.

The subject is a mammalian subject having a brain tumor, brain metastases, brain malignancy or a CNS disorder, optionally a glioma; and the antibody or antibody fragment comprises Trastuzumab, Alemtuzumab, Atezolizumab, Avelumab, Bevacizumab, Blinatumomab, Brentuximab vedotin, Cemiplimab, Cetuximab, Daclizumab, Daratumumab, Dinutuximab, Durvalumab, Edrecolomab, Elotuzumab, Enfortumab vedotin, Eptinezumab, Erenumab, Fremanezumab, Galcanezumab, Gemtuzumab ozogamicin, Ibritumomab tiuxetan, Idarucizumab, Inotuzumab ozogamicin, Ipilimumab, Isatuximab, Natalizumab, Nebacumab, Necitumumab, Nivolumab, Obinutuzumab, Ocrelizumab, Ofatumumab, Olaratumab, Panitumumab, Pembrolizumab, Pertuzumab, Polatuzumab vedotin, Ramucirumab, Rituximab, Sacituzumab govitecan Tafasitamab, Tositumomab-1131, an anti-PD-1 antibody, or a combination thereof.

The subject has been administered with the composition within 2 hours or less has a reduced level of an occudin, a claudin, and/or a Junction adhesion molecule in at least a portion of the blood brain barrier, compared to a control subject.

According to another preferred embodiment of the present invention, the present invention provides a pharmaceutical composition comprising ethyl alcohol at 0.1-3% (v/v) and a pharmaceutically acceptable carrier. The pharmaceutically acceptable carrier comprises water and optionally one or more of bacteriostatic preservatives and sodium chloride.

Material and Methods for Experiments

According to the preferred embodiment of the present invention, IA and IC injections are employed. The method of IA and IC injections are similar to the IV push in the clinic which comprises essentially the steps of:

pushing the injection composition at a particular infusion flow rate immediately after the placement of the IA catheter into the internal carotid artery (ICA) or the insertion of the injection needle into the left ventricle via the ultrasound-guided intracardiac (IC) puncture at room temperature.

When performing the IA and IC injections, the infusion flow rate is about 5-7 µl/second (0.3-0.45 ml/min), the infusion volume is about 10% of the body weight (at 1 µl/g, volume/weight ratio), and USP purified water is used to reconstitute varied EA solutions at room temperature.

According to the preferred embodiment of the present invention, the methodology of intraarterial catheter placement into the internal carotid artery (ICA) in a rat animal model is used, which includes the steps of: inserting an arterial catheter into the internal carotid artery via the external carotid artery. The various experimental infusion solutions which are be used in the following experiments at least include the followings:
1. 2% (w/v) Evans blue (EB) in dH2O
2. 3% ethyl alcohol and 2% EB
3. IA 50 µg Goat anti-rat IgG (H+L)-Alexa Fluor 647
4. IV 50 µg Goat anti-rat IgG (H+L)-Alexa Fluor 647
5. 3% ethyl alcohol and IA 50 µg Goat anti-rat IgG (H+L)-Alexa Fluor 647 (ab150167)
6. IA 10 µg Rabbit anti-human IgG (H+L)-Alexa Fluor 647 (ab201841)
7. IV 10 µg Rabbit anti-human IgG (H+L)-Alexa Fluor 647
8. 3% ethyl alcohol and IA 10 µg Rabbit anti-human IgG (H+L)-Alexa Fluor 647 (ab201841)
9. IA 25% mannitol at 0.06 ml/second for 30 seconds As high-volume mannitol is required for IA injection to open BBB, therefore IV injection of 300 µl 2% EB via tail vein will be done right after the IA mannitol application. 2 hours after the procedures, the experimental rats will be euthanized and perfused with 30 ml cold PBS (Phosphate-buffered saline).

In the following experiments, the sources of applicable ethyl alcohol used are as follows:

100% Pure 200 proof Culinary Solvent can be purchased from "The Northern Maine Distilling Company" 55 Baker Blvd, Brewer, Maine 04412.

The alcohol made from Chinese liquor factory.

99.5% 200 proof pure ethyl alcohol can be purchased from Sigma Aldrich (Burlington, MA USA), Cat. #459836-100 ml.

Dehydrated Alcohol, 200 Proof, Undenatured, USP from Spectrum Chemicals (Gardena, CA USA), Cat #ET107-100 ml.

Experiments for the ethyl alcohol mediated BBB disruption are performed and the injection method includes:
 I. Intracardiac injection via left ventricle
 II. Catheter placement via internal carotid artery
 III. Intra-arterial (IA) Injection of ethyl alcohol accomplished by ultrasound guided intracardiac left ventricle injection:

Ethyl alcohol is injected into the left ventricle (LV) of a mouse via ultrasound guidance. The mouse is anesthetized in an induction chamber using 2-3% isoflurane in 100% oxygen at a rate of 0.2-0.5 L/min. Fur over the thorax area was removed and the animal is placed in a stereotactic frame in supine position, securing the upper and lower limbs to avoid body movement. The ultrasound transducer is placed above the chest of the animal, and the injection syringe is anchored to a platform to avoid erratic needle movements. An electrocardiogram monitor is used to monitor heart function during the intracardiac injection. Injection of ethyl alcohol (0.3% in 0.9% sodium chloride, USP) is performed through a 30G needle, and a total volume of 40 µL is injected over the course of 5 seconds.

Ultrasound Guided Intracardiac Puncture. The ultrasound guided intracardiac (IC) injection is applied to replace the intraarterial (IA) ethyl alcohol injection. Different steps of the ultrasound-guided intracardiac puncture procedure includes (a) carrying out 30G needle puncture under the ultrasound; (b) carrying out percutaneous puncture of 30G needle into the LV; (c) carrying out injection through the LV; and (d) observing normal heartbeat of the LV after the retraction of the injection needle.

The results of the above experiments showed that IA ethyl alcohol has significant effect on BBB disruption.

Experiment 1: IA Ethyl Alcohol Mediated BBB Disruption for Delivering Extravasated EB Dye into the Brain IA ethyl alcohol at a selected range of 0.1%, 0.3%, 3% and 5% are used on mice to test the effect of IA ethyl alcohol mediated BBB disruption. EB dye is used as the non-BBB permeable substance. Any blue color observed in the brain indicates that the BBB is disrupted and the extravasated EB dye is delivered to the brain. Photos of the brain after IA ethyl alcohol treatment are taken for observation and comparison.

Results

The photos of the treated brain by IA ethyl alcohol are shown in FIG. 2 of the drawings.

The blue color can be observed in the brain of mice by using IA ethyl alcohol at 0.1%, 0.3%, 3% and 5%. The blue color is observed in all different parts of the brain. No patchy pattern of blue color is observed.

The results of efficacy of IA ethyl alcohol induced BBB opening at a concentration of 0.1%, 0.3%, 3% and 5% are summarized in Table 1 as follows:

TABLE 1

|  | 5% | 3% | 0.3% | 0.1% | Control |
|---|---|---|---|---|---|
| EB dye | Observed | Observed | Observed | Observed | Not Observed |
| EB dye penetration level | Widely spread in different parts of the brain | Widely spread in different parts of the brain | Widely spread in different parts of the brain | Widely spread in different parts of the brain | Not observed |
| Patchy Pattern of EB dye | Not observed | Not observed | Not observed | Not observed | Not observed |

The results showed that IA ethyl alcohol at 0.1%, 0.3%, 3% and 5% are able to cause BBB disruption and a non-patchy pattern of distribution of the non-BBB substance is achieved. In other words, IA ethyl alcohol is effective in BBB opening for delivering a relatively even distribution of the non-BBB substance.

The potency of ethyl alcohol induced BBB permeabilization, and a homogenized extravasation of EB is observed. The results show that ethyl alcohol can induce an immediate, transient, and recoverable BBB opening.

Experiment 2: The Comparison of Extravasated EB Dye into Brain Parenchyma after IA Ethyl Alcohol, Mannitol, and NEO100 by Evans Blue Dye The same procedure of the above Experiment I is repeated by replacing IA ethyl alcohol with mannitol and NEO100 respectively. Photos of the brain after treatment are taken.

Results

The photos of the treated brain by IA mannitol and IA NEO100 at various concentrations are shown in FIG. 2 of the drawings. The efficacy and the major differences of disrupted BBB mediated by the application of ethyl alcohol, NEO100, and mannitol can be seen in the photos of the brain.

1. The blue color can be observed in the brain of mice by using IA NEO100 at 0.1%, 0.3%, 3% and 5%. The blue color is observed in all different parts of the brain. Patchy pattern of blue color is observed. An overall blue color spreading over the entire brain is observed at 0.3%, 3% and 5%. A few patchy spots are observed at 0.1%.

The results of efficacy of IA NEO100 induced BBB opening at a concentration of 0.1%, 0.3%, 3% and 5% are summarized in Table 2 as follows:

TABLE 2

|  | 5% | 3% | 0.3% | 0.1% | Control |
|---|---|---|---|---|---|
| EB dye | Observed | Observed | Observed | Observed | Not Observed |
| EB dye penetration level | Widely spread in different parts of the brain | Widely spread in different parts of the brain | Widely spread in different parts of the brain | Few Patchy spots | Not observed |
| Patchy Pattern of EB dye | Observed | Observed | Observed | Observed | Not observed |

Due to the lipophilic properties of NEO100, a pattern of patchy extravasation of EB is spotted from perfused brain tissues in NEO100 mediated BBB opening.

When comparing the NEO100 and ethyl alcohol groups, a more homogenized pattern of EB spreading inside the brain is observed in the ethyl alcohol group.

2. The blue color cannot be observed in the brain of mice by using IA mannitol at 0.1%, 0.3%, 3% and 5%. Some brain damage is observed.

The results of efficacy of IA Mannitol induced BBB opening at a concentration of 0.1%, 0.3%, 3% and 5% are summarized in Table 3 as follows:

TABLE 3

|  | 5% | 3% | 0.3% | 0.1% | Control |
|---|---|---|---|---|---|
| EB dye | Not observed | Not observed | Not observed | Not observed | Not observed |
| EB dye penetration | Not observed | Not observed | Not observed | Not observed | Not observed |

Mannitol is a hyperosmotic agent, which can cause the shrinkage of endothelial cells, and physically tears the cell apart to permeabilize the BBB. Without the required procedure requirements such as the volume applied, the speed of injection, and the temperature of mannitol applied, mannitol fails to cause BBB disruption. No disrupted BBB observed from the mice when treated with IC application of varied volume of high concentration of mannitol.

The application of mannitol does not illustrate any effect to disrupt BBB under the similar condition as NEO100 and ethyl alcohol.

Experiment 3: Efficacy and Pattern of IA Ethyl Alcohol IA Mediated BBB Disruption in Delivering Extravasated EB Dye into the Brain IA ethyl alcohol at a selected range of 0.3%, 1% and 3% are used on mice to test the effect of IA ethyl alcohol mediated BBB disruption for delivering extravasated EB dye into the brain. Extravasated EB dye is used as the non-BBB permeable substance. Any blue color observed in the brain indicates that the BBB is disrupted and the EB dye is delivered to the brain. Photos of the brain at superior view and sagittal view after IA ethyl alcohol treatment are taken for observation and comparison.

Figure 3:
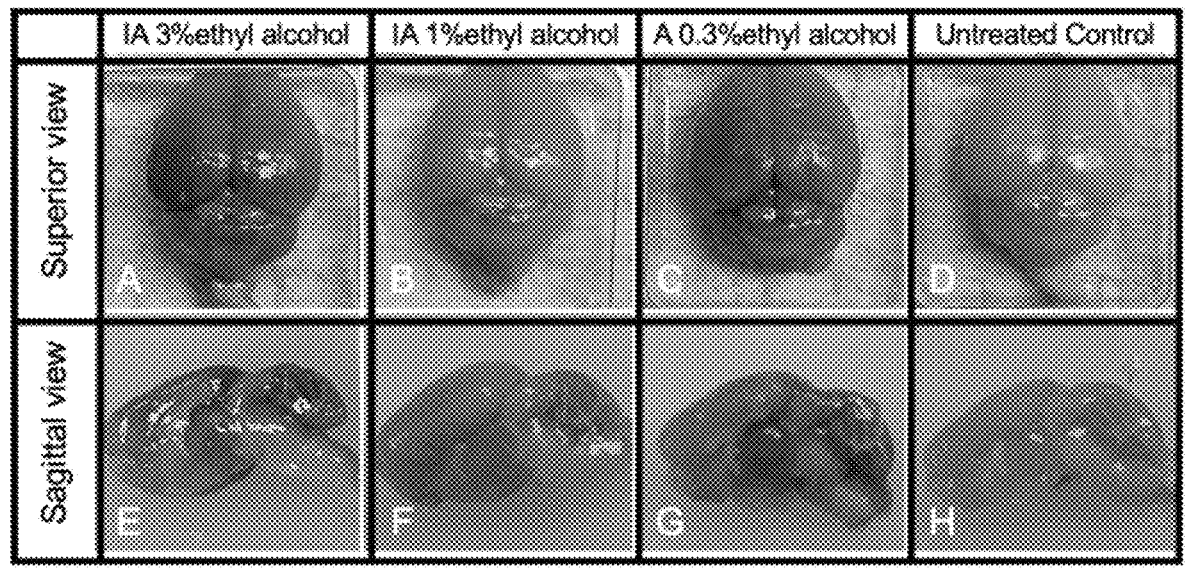
FIG. 3 illustrates the photos of treated brains after IA ethyl alcohol with Evans Blue dye at various concentrations.

Results:

The photos of the treated brain in superior view and sagittal view by IA ethyl alcohol at various concentrations are shown in FIG. 3 of the drawings.

The superior view of homogenized spreading of EB inside the brain at 0.3%, 1% and 3% is observed.

The results show that the ethyl alcohol-induced BBB opening is in a homogenized pattern. Due to its infinitely soluble (fully miscible) in water, ethyl alcohol can be easily diluted into any lower concentration as desired. This homogenized pattern of BBB opening has important clinical significance, which indicates that the non-BBB substance can be delivered to the targeted brain tissue that supplies by a special cerebral artery, therefore the non-BBB substance is delivered in a controllable manner.

Experiment 4: Pharmacodynamic Study of IA Ethyl Alcohol Induced BBB Opening

Figure 4:
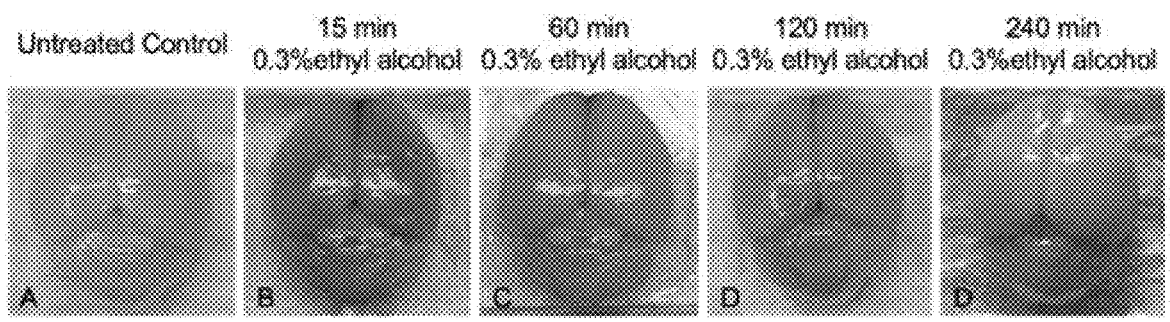
FIG. 4 illustrates the photos of treated brains after IA ethyl alcohol with Evans Blue dye at different timeline.

Four test groups with EA treatment and one control group without EA treatment are used. Evans blue is used as the non-BBB permeable substance. For the four test groups, intra-arterial ethyl alcohol at 0.3% is administered into the animal subject. Then Evans blue is administered to the animal subject of four different groups following the ethyl alcohol administration at 15 min, 60 min, 120 min and 240 min respectively. Photos of the brain are taken for studies and observations.
Results:

The photos of the treated brain by IA ethyl alcohol at 0.3% are shown in FIG. 4 of the drawings. The results demonstrated that lower doses (0.3%) of ethyl alcohol have great potential to induce a transient BBB disruption. As the time of EB administration following EA administration increased, the level of blue color observed in the brain decrease. This shows that the ethyl alcohol has a transient effect on BBB disruption.

Experiment 5: The Ultrastructure Changes after the Application of IA Ethyl Alcohol Illustrated by TEM (Transmission Electronic Microscopy)

Figure 5:
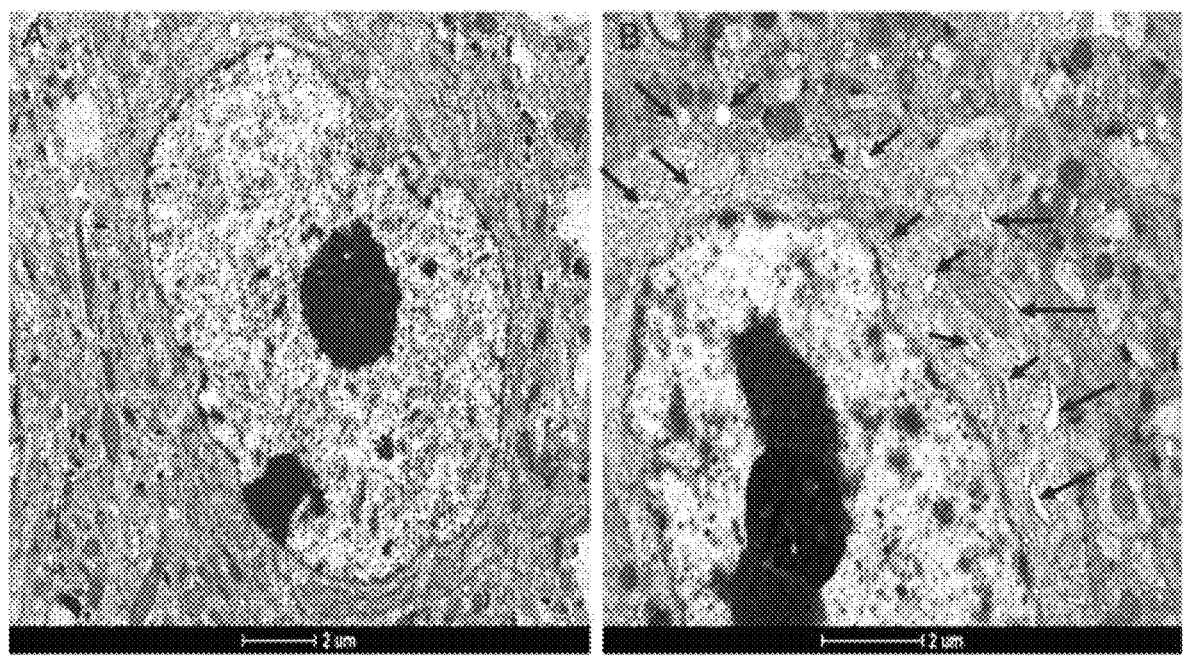
FIG. 5 illustrates the micrographs in different treatment groups. The scale bar is 2 µm.

Ultrathin sections of the brains previously processed with Pelco BioWave Pro (Pelco, Fresno, CA USA) are cut at 99 nm and collected on 200-mesh copper grids. The grids are post-stained in uranyl acetate (0.2%) and filtered for 15 min. Grids are further stained with lead citrate and filtered for 5 min. The Tecnai Spirit G2TEM (Nanoscience Initiative, Nicholas Terrace, New York, USA) with an installed MegaView camera is used to image the samples. The micrographs are illustrated in FIG. 5 of the drawings. The scale bar is 2 µm.

The microstructure changes in brains from the animals treated with ethyl alcohol compared to normal untreated brain tissues by TEM (Transmission Electronic Microscope). As shown in FIG. 5, the micrograph A illustrates the ultrastructure of normal brain tissues without IA intervention of ethyl alcohol and the micrograph B illustrates the ultrastructure of brain tissues with IA intervention of ethyl alcohol. The ultrastructure of brain tissues with IA intervention of ethyl alcohol demonstrates many open spaces (pointed by blue arrowheads).

Experiment 6: Confocal Imaging of Trastuzumab with or without IA Ethyl Alcohol

Figure 6:
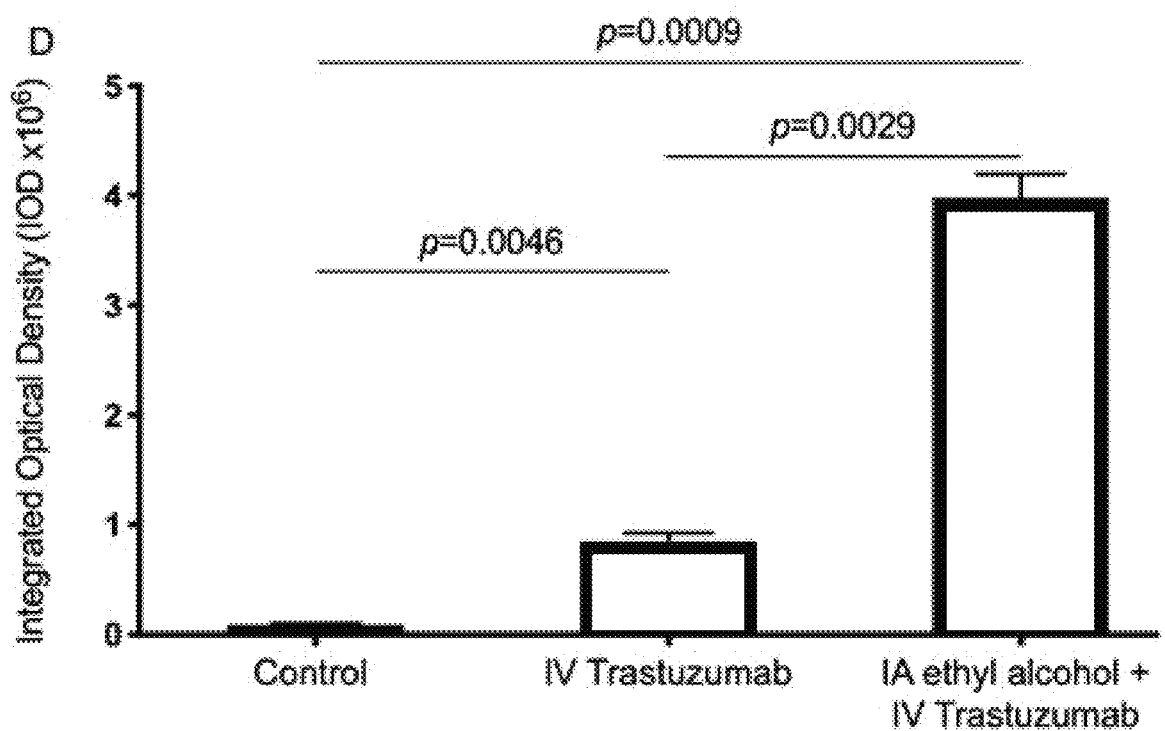
FIG. 6 illustrates the results of confocal imaging in different treatment groups.

The images of the three groups: untreated control, IV Trastuzumab and IA ethyl alcohol with IV Trastuzumab, are taken and analysis. The analysis of integrated optical density of the three groups are shown in FIG. 6 of the drawings. The images results demonstrate that IA ethyl alcohol can significantly enhance the antibody, Trastuzumab brain tumor entry, and accumulate exclusively inside the tumor.

Experiment 7: Confocal Imaging to Detect the Extravasated Antibody Trastuzumab, the Checkpoint Inhibitor, Anti-PD-1 Antibody Mediated by IA Ethyl Alcohol The standard detailed protocol is followed. Primary antibodies used are FITC-conjugated Armenian hamster anti-mouse PD-1 (11-9985-82, ThermoFisher Scientific, San Diego, CA USA), and rat anti-mouse PD-1 (BE0146, Bio X Cell, West Lebanon, NH USA). The secondary antibody is ALEXA FLUOR® 647 goat anti-rabbit (ab150083, Abcam). The images under different schedules of applications: Untreated control, IA Anti-PD-1, IV Anti-PD-1, IA ethyl alcohol+IA Anti-PD-1, IA ethyl alcohol+IV Anti-PD-1 and IV ethyl alcohol+IV Anti-PD-1, are taken. The results show that IA ethyl alcohol can mediate checkpoint inhibitor, anti-PD-1 antibody brain tumor entry.

Experiment 8: The Immunohistochemistry Staining

Figure 7:
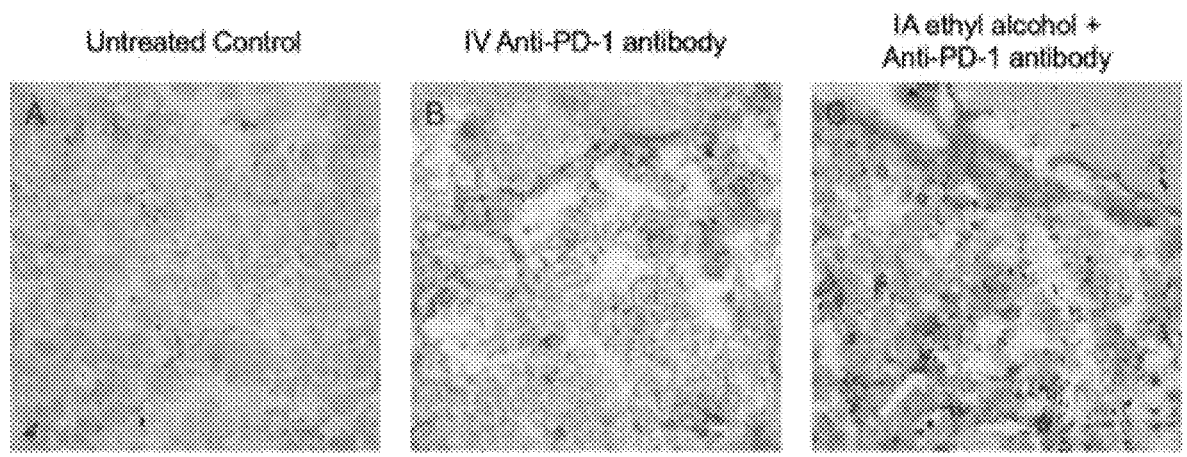
FIG. 7 illustrates the immunohistochemistry staining of untreated control group, IV Anti-PD-1 antibody group, and IA ethyl alcohol+Anti-PD-1 antibody group.

Standard protocols for immunohistochemistry are followed. The primary antibody is rabbit anti-CD8 (ab4055, Abcam). Three independent experimental fields are examined, and images are analyzed and quantitated using ImageJ software of the National Institutes of Health. The results of untreated control, IV Anti-PD-1 antibody, and IA ethyl alcohol+Anti-PD-1 antibody are shown in FIG. 7 of the drawings.

The comparison of the replenished CD8+T lymphocytes induced inside the tumor of the three groups: untreated control, IV Anti-PD-1 antibody, and IA ethyl alcohol+Anti-PD-1 antibody shows that IA ethyl alcohol+Anti-PD-1 antibody can significantly enhance the replenishment of CD8+T lymphocytes induced inside the tumor.

Experiment 9: Western Blot Experiment

Western blot is performed to quantify the tight junction proteins expression from the mice treated with and without IA ethyl alcohol. The membrane and cytosolic proteins are extracted with a MEM-PER™ Plus Membrane Protein Extraction Kit (ThermoFisher Scientific, Waltham, MA USA). Proteins are separated by SDS-PAGE and transferred to nitrocellulose membranes. Primary antibodies used are rabbit anti-claudin-3 (ab15102), rabbit anti-claudin-5 (ab15106), rabbit anti-claudin-6 (ab99226), rabbit anti-JAM (ab125886), rabbit anti-occludin (ab222691, 1:200, Abcam, Cambridge, MA USA), and mouse anti-β-actin (66009, 1:1000, Proteintech, Rosemont, IL USA). Secondary antibodies used are HRP-conjugated goat anti-mouse (SA00001, 1:2500, Proteintech) and goat anti-rabbit (7074, 1:2500, Cell Signaling Technology).

Endothelial cells (ECs) form the inner lining of the vessel wall, and perivascular cells, referred to as pericytes, and vascular smooth muscle cells or mural cells, which envelop the surface of the vascular tube. The BBB possess specific characteristics (i.e., tight junction protein complexes, influx and efflux transporters) that control permeation of circulating solutes including therapeutic agents. Due to the complexity and integrated structures, BBB controls the crossing of chemicals and preventing toxic material from the circulation entering the brain. Structurally, BBB is reliant on non-fenestrated EC that form the blood vessel wall and is supported by both pericytes and astrocytes. Pericytes can modulate and maintain the BBB through the release of signaling factors to determine the number of EC tight junctions as a physical barrier, and direct the polarization of astrocyte end feet. A reduction in pericyte numbers can cause a loss of tight junctions between EC, leading to increased BBB permeability. Also, pericytes can control the movement of substances between the bloodstream and the brain parenchyma, including the vascular clearance of toxic species out of the brain. The tight junction is essential for establishing a barrier against free diffusion between different extracellular compartments as well. The tight junctions (TJs) are protein complexes that through intercellular interactions obliterate the paracellular space to form a paracellular diffusion barrier. Some of them have been identified as transmembrane proteins named as occludins. Claudins, which are the main structural proteins of tight junction strands. They interact with the long C-terminal cytoplasmic tail of claudin and JAM (junctional adhesion molecule) in the membrane. Also, Pgp, an ATP-binding cassette (ABC) efflux transporter, is predominantly expressed on the luminal (blood-facing) surface of the BBB endothelium, where it serves as a functional barrier in regulating the passage of a wide variety of endo- and xenobiotic compounds out of the central nervous system. The disruption of the physical barrier of the BBB impedes the effective delivery of the drugs into the brain. The tight junction proteins that are supposed to maintain the integrity of BBB include occudins, claudin, and junction adhesion molecules, etc.

Figure 8:
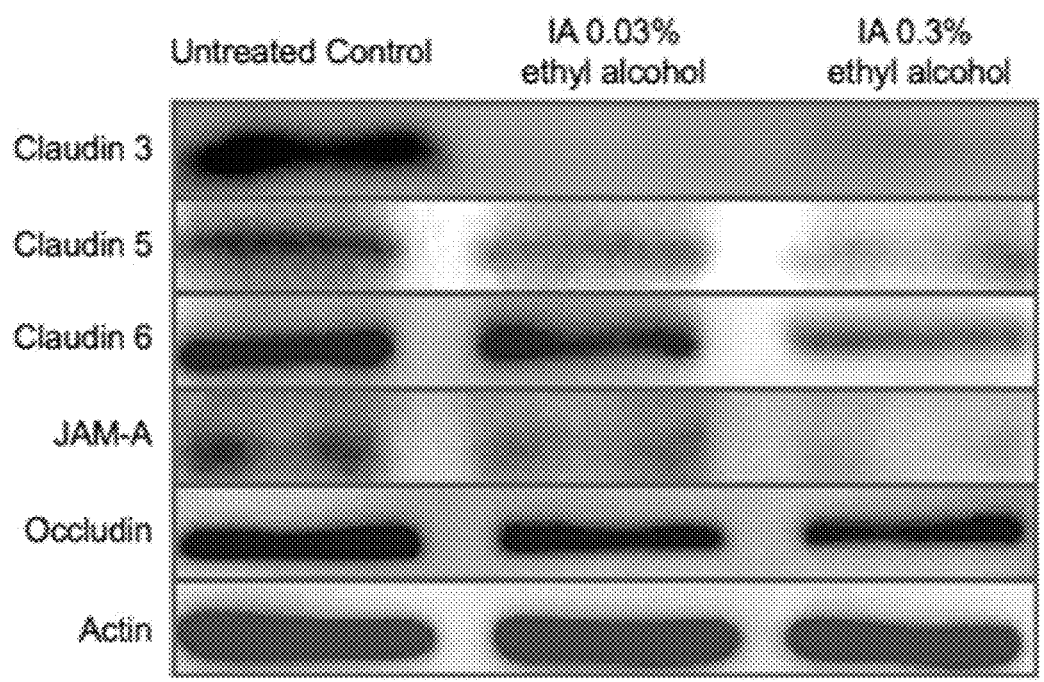
FIG. 8 illustrates the quantified tight junction proteins in brain tissues by western blot from the animals treated with and without IA ethyl alcohol.

In this experiment, the tight junction proteins in brain tissues are examined by western blot. The animals treated with IA 0.03% ethyl alcohol, IA 0.3% ethyl alcohol and a control group without IA ethyl alcohol treatment are examined. The results are shown in FIG. 8 of the drawings.

Experiment 10: Ultrasound-Guided Intracardiac Injection in Experimental Rats

1. To set up the ultrasound imaging system before anesthetizing the rats; to anesthetize the rats in an induction chamber using 3-4% isoflurane in 100% oxygen at a rate of 0.2-0.5 L/min; to confirm proper anesthetization before performing imaging by pinching the toe, rolling the rats.
2. To completely remove the fur over the thorax area using hair removal cream.
3. To place the experimental animal on the imaging table in the supine position and secure both the upper and lower limbs with adhesive tape to avoid body movement during the procedure.
4. To clean up the skin of the thorax area using a 10% povidone/iodine swab followed by a 70% ethanol swab. Apply a thick layer of gel to the thorax area of the animal.
5. To mount the transducer and adjust the position until the left ventricle is clearly visible.
6. To load 350 μl varied concentrations of Ethyl Alcohol (EA, from 0.01%-5%) in 2% EB solution into a 1-mL syringe with a 30 1G needle and secure the syringe to the appropriate holder. To visualize pulsating blood, keep a small air column in the syringe; advance the syringe towards the animal thorax, adjust the needle trajectory using the ultrasound guidance, and enter the left ventricle, as shown in FIG. 1. and to complete the IC injection within 30 seconds.
7. To withdraw the needle, release that rat, and monitor until complete recovery from anesthesia The rats are treated with varying concentrations of EA via intracardiac injection. The EA concentrations are 3%, 1%, 0.3%, 0.1% and 0.01%. Sham control (without treatment as negative control) is included in this experiment. Even's blue is used as a non-BBB permeable substance to study the ethyl alcohol (via intracardiac injection) medicated BBB opening. After treatment, photographs are taken from superior and inferior views for the brains removed from the rats.

Results

Tinted blue color, which stands for the extravasated dye, Even's blue, is observed in all treatment groups. No color is observed for sham control group. This indicates that the ethyl alcohol (via intracardiac injection) can medicate BBB opening for delivery of non-BBB permeable substance (Even's blue).

Experiment 11: Relationship Between Injection Site and Distribution of BBB Opening The seven major branches of internal carotid artery ICA are: 1. Meningohypophyseal artery; 2. Ophthalmic artery; 3. Posterior communicating artery; 4. Anterior choroidal artery; 5. Middle cerebral artery; 6. Anterior cerebral artery, and 7. Anterior communicating artery. As the ophthalmic artery is the first major branch derived from the internal carotid artery, the extravasated EB from the disrupted BBB stained the eye (left) in blue, which is also a critical indicator to demonstrate for BBB opening.

Fisher 344 rats are used for left side intraarterial (IA) catheter placement and the injection of Ethyl Alcohol (EA)+2% EB. Photographs of Fisher 344 rats in prone position and in supine position are taken for study and analysis.

Results:

The extravasated EB spreading inside the left vitreous humor, but not inside the right are observed in photographs of Fisher 344 rats in prone position and in supine position.

The results indicate that the point of entry of ethyl alcohol can lead to a localized extravasated EB spreading.

Experiment 12: Comparison of Hyperosmotic Agent, Mannitol and EA Mediated BBB Disruption Hyperosmotic induced BBB disruption is accomplished by intracarotid infusion of a hypertonic mannitol solution is mediated by vasodilatation and shrinkage of cerebrovascular endothelial cells, with the widening of the inter-endothelial tight junctions. The following conditions must be required to make it possible. 1). High concentration 25%; 2). Need to be prewarmed to 37° C. before the application; 3). High pressure to maintain a high-speed injection; and 4). Large injection volume. The following three groups are performed: A. 1800 μl 25% mannitol infused in 30 seconds (the minimum volume at 0.06 ml/s, 30 seconds). B. 300 μl 3% USDA Organic EA infused in 5 seconds (in room temperature, and at the injection speed of 0.06 ml/s, 5 seconds). C. 300 μl 25% mannitol infused at regular speed in 1 minute (warmed up to 37° C. before the application).

Photos of the animal in prone position and the brain are taken for studies and analysis.

Results

EB is observed in both group A and B. EB is not observed in group C. Therefore, induced BBB disruption is achieved in both group A and B, but not C.

Experiment 13A: EA Mediated BBB Disruption Via Intraarterial Catheter Placed in Left Internal Carotid Artery Experimental rats are treated with varying concentrations of IA EA (in room temperature, 300 µl 5%, 3%, and 1% EA infused slowly in 1 minute, respectively) and are applied through the arterial catheter placed into the left internal carotid artery. The photographs of the rats in prone position, the perfused rat brains (superior/inferior view) and the coronal sections of the rats are taken 2 hours after the IA injection of a mixture of EA+2% EB.

The coronal sections demonstrate the extravasated EB spreading out homogeneously through almost the whole section of the left hemisphere of the brain.

Experiment 13B: EA Mediated BBB Disruption Via Intraarterial Catheter Placed in Left Internal Carotid Artery Experimental rats are treated with varying concentrations of IA EA (in room temperature, 300 µl 0.3%, 0.1%, and 0.01% EA infused slowly in 1 minute, respectively) and are applied through the arterial catheter placed into the left internal carotid artery. The photographs of the rats in prone position, the perfused rat brains (superior/inferior view) and the coronal sections of the rats are taken 2 hours after the IA injection of a mixture of EA+2% EB.

The lower concentrations of EA-induced BBB disruption can be differentiated from the perfused brain tissues (the superior/inferior view) and the dissected coronal section of the brain. Even at the lowest concentration of EA at 0.01% (in room temperature, infused slowly in 1 minute), the extravasated blue EB still can be visualized in the left hemisphere of the brain tissue.

Experiment 14: The Detection of Autofluorescence from EB Dye by Confocal Microscopy The rapid visualization of the distribution of extravasated EB/albumin conjugate after IA catheter delivery of 3% EA by fluorescence from EB dye by confocal microscopy is performed.

The fluorescence from EB dye permits the rapid visualization of the distribution of extravasated EB/albumin conjugate after IA catheter delivery of 3% EA. An untreated rat group is used as a control. IA 3% EA+2% EB solution treatment is used as the testing group.

The photographs of cryostatic brain sections from an untreated rat are stained with DAPI to illustrate the background nuclear staining under confocal imaging, respectively. The photo-/micro-graphs and magnified confocal images of the brain from the rat treated with IA 3% EA+2% EB solution are obtained for studies and comparison. The micrograph of the whole brain section is scanned by confocal microscopy to obtain the confocal images. The confocal images is further enlarged for observation.

In the photo-/micro-graphs of the brain from the rat treated with IA 3% EA+2% EB solution, the majority of extravasated EB can be visualized (blue color in the photograph; and pink color in the micrograph) in the left hemisphere of the brain section; the autofluorescence of EB/albumin can be detected. The micrograph of the whole brain section demonstrates that a massive spreading of autofluorescence (dark red color) from EB/albumin can be detected in the left hemisphere of the brain. The micrograph with magnified confocal images show an extensive spreading EB in red (magnification 63×; the scale bar, 50 µm).

Experiment 15: Intra-Arterial Ethyl Alcohol Mediated Antibody Delivery into Normal Rat Brain Ethyl alcohol mediated antibody brain entry via catheter placement through the internal carotid artery (left). The experimental rat is treated with IA 3% EA+50 µg goat anti-rat IgG (H+L) ALEXA FLUOR® 647 (ab150167, Cambridge, MA USA) via the left internal carotid artery catheter. The micrograph of the whole brain section is scanned with a fluorescence microscope. Two sections from the right and left hemispheres of the brain are selected respectively are enlarged with a magnification of 63×. The scale bar used is 50 µm. The images of the left and right hemispheres, and the enlarged sections are studied.

Results

More dense fluorescence is observed on the left hemisphere when compared to the right hemisphere. More dispersed antibodies labeled with ALEXA FLUOR® 647 is observed on the left hemisphere when compared to the right hemisphere.

The fluorescence represents the spreading of the dispersed antibodies labeled with ALEXA FLUOR® 647. In other words, ethyl alcohol can mediate an immediate and efficient BBB opening and the concentration of the non-BBB substance can be controlled through the site of injection.

Experiment 16: The Comparison of Goat Anti-Rat IgG (H+L) ALEXA FLUOR® 647 in the Experimental Rats EA mediated antibody (goat anti-rat IgG (H+L) ALEXA FLUOR® 647) brain entry via catheter placement through the internal carotid artery (left) are tested. The cryosection photographs and images from the confocal microscope after EA treatment are taken for studies. An EA untreated group is used as a control group. IA antibody [50 µg goat anti-rat IgG (H+L) FLUOR® 647]; and IA 3% EA+antibody [50 µg goat anti-rat IgG (H+L) ALEXA FLUOR® 647 are the two comparison groups.

Results

The corresponding images from the confocal microscope (the blue DAPI is used to stain the nuclear as background staining; the testing antibody (goat anti-rat IgG (H+L) Alexa ALEXA FLUOR® 647) is stained with pink color, and the yellow color is used to for the merged images from DAPI and antibody) are obtained. An even and widely spread pink color is observed in the IA 3% EA+antibody [50 µg goat anti-rat IgG (H+L) ALEXA FLUOR® 647 group while some pink color is observed in the IA antibody [50 µg goat anti-rat IgG (H+L) Alexa Fluor 647] group. The results indicate that IA 3% EA can mediate the entry of the antibody effectively.

Experiment 17: The Comparison of ALEXA FLUOR® 647 Anti-Human IgG in the Experimental Rats An ALEXA FLUOR® 647 anti-human IgG antibody was applied via IA catheter delivery to rule out the nonspecific binding to the experimental rats. 3% EA mediated antibody brain entry via catheter placement through the internal carotid artery (left) is tested and compared. The cryosection photographs and images from the confocal microscope after EA treatment are taken for studies. An EA untreated group is used as a control group. IA antibody [50 μg ALEXA FLUOR® 647 anti-human IgG antibody (ab201841); and IA 3% EA+50 μg ALEXA FLUOR® 647 anti-human IgG antibody (ab201841, Cambridge, MA USA) are the two comparison groups.

Results

The corresponding images from the confocal microscope (the blue DAPI is used to stain the nuclear as background staining; the testing antibody (ALEXA FLUOR® 647 anti-human IgG antibody) is stained with pink color, and the yellow color is used for the merged images from DAPI and antibody).

An even and widely spread pink color is observed in the EA+antibody group while some pink color is observed in the antibody group. The results indicate that IA 3% EA can mediate the entry of the antibody effectively.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A method of inducing blood-brain barrier (BBB) opening for delivery of a non-BBB permeable substance to a brain of a subject, comprising the steps of:
administering via an injection site an ethyl alcohol as a single active ingredient into a blood stream of the subject by intra-arterial injection, intracardiac injection, or intra-arterial injection guided by ultrasound, wherein said ethyl alcohol has a concentration of 0.01%-5% v/v at the injection site, wherein said ethyl alcohol reaches the brain of the subject to induce a transient opening of the blood-brain barrier so that the non-BBB permeable substance is capable of penetrating the blood-brain barrier to reach the brain of the subject homogeneously.

2. The method, as recited in claim 1, wherein said non-BBB permeable substance comprises a therapeutic agent, a diagnostic agent, or a prophylactic agent, and said non-BBB permeable substance is administered to the subject before, at the same time, or after the ethyl alcohol is administered to the subject.

3. The method, as recited in claim 1, wherein said ethyl alcohol reduces level of tight junction proteins in at least a portion of the blood-brain barrier immediately after the ethyl alcohol is administered to the subject, then the blood-brain barrier is restored to normal, blocking the non-BBB permeable substance from entering the brain.

4. The method, as recited in claim 2, wherein said ethyl alcohol reduces level of tight junction proteins in at least a portion of the blood-brain barrier immediately after the ethyl alcohol is administered to the subject, then the blood-brain barrier is restored to normal, blocking the non-BBB permeable substance from entering the brain.

5. The method, as recited in claim 2, wherein said ethyl alcohol has a concentration of 0.01%-0.05% v/v.

6. The method, as recited in claim 1, wherein said ethyl alcohol is administered through a left-side intraarterial catheter placement for producing a localized left-side delivery of the non-BBB permeable substance.

7. The method, as recited in claim 4, wherein said ethyl alcohol is administered through a left-side intraarterial (IA) catheter placement for producing a localized left-side delivery of the non-BBB permeable substance.

8. The method, as recited in claim 1, wherein said ethyl alcohol is administered via intra-arterial injection or intracardiac injection, an infusion flow rate of intra-arterial injection or intracardiac injection is about 5-7 μl/second (0.3-0.45 ml/min) and an infusion volume is about 10% of the body weight (at 1 μl/g, volume/weight ratio) of the subject.

9. The method, as recited in claim 4, wherein said ethyl alcohol is administered via intra-arterial injection or intracardiac injection, an infusion flow rate of intra-arterial injection or intracardiac injection is about 5-7 μl/second (0.3-0.45 ml/min) and an infusion volume is about 10% of the body weight (at 1 μl/g, volume/weight ratio) of the subject.

10. The method, as recited in claim 6, wherein said ethyl alcohol is administered via intra-arterial injection, an infusion flow rate of intra-arterial injection is about 5-7 μl/second (0.3-0.45 ml/min) and an infusion volume is about 10% of the body weight (at 1 μl/g, volume/weight ratio) of the subject.

11. The method, as recited in claim 4, wherein said non-BBB permeable substance is one or more selected from the group consisting of: a small molecular tracer, Evans blue dye, a cancer therapeutic agent, doxorubicin, an antibody, an antibody fragment, Trastuzumab, a check point inhibitor, an anti-PD1 antibody or a PD1-binding fragment thereof, a monoclonal antibody, a peptide, a growth factor, a cytokine, and an enzyme.

12. The method, as recited in claim 11, wherein said non-BBB permeable substance is selected from the group consisting of Trastuzumab, Alemtuzumab, Atezolizumab, Avelumab, Bevacizumab, Blinatumomab, Brentuximab vedotin, Cemiplimab, Cetuximab, Daclizumab, Daratumumab, Dinutuximab, Durvalumab, Edrecolomab, Elotuzumab, Enfortumab vedotin, Eptinezumab, Erenumab, Fremanezumab, Galcanezumab, Gemtuzumab ozogamicin, Ibritumomab tiuxetan, Idarucizumab, Inotuzumab ozogamicin, Ipilimumab, Isatuximab, Natalizumab, Nebacumab, Necitumumab, Nivolumab, Obinutuzumab, Ocrelizumab, Ofatumumab, Olaratumab, Panitumumab, Pembrolizumab, Pertuzumab, Polatuzumab vedotin, Ramucirumab, Rituximab, Sacituzumab govitecan, Tafasitamab, Tositumomab-1131, and an anti-PD-1 antibody.

13. The method, as recited in claim 4, wherein the therapeutic agent, the diagnostic agent, or the prophylactic agent is one or more selected from the group consisting of: a small molecular tracer, Evans blue dye, a cancer therapeutic agent, doxorubicin, an antibody, an antibody fragment, Trastuzumab, a check point inhibitor, an anti-PD1 antibody or a PD1-binding fragment thereof, a monoclonal antibody, a peptide, a growth factor, a cytokine, and an enzyme.

14. The method, as recited in claim 3, wherein said ethyl alcohol has a concentration of 0.01%-0.05% v/v.

15. The method, as recited in claim 4, wherein said ethyl alcohol has a concentration of 0.01%-0.05% v/v.

16. The method, as recited in claim 10, wherein said ethyl alcohol has a concentration of 0.01%-0.05% v/v.

17. The method, as recited in claim 12, wherein said ethyl alcohol has a concentration of 0.01%-0.05% v/v.

18. A method of inducing blood-brain barrier (BBB) opening for delivery of a non-BBB permeable substance to a brain of a subject for treating central nervous system (CNS) disorder, comprising the steps of:
    administering an ethyl alcohol as a single active ingredient into a blood stream of the subject via intra-arterial injection, intracardiac injection, or intra-arterial injection guided by ultrasound,
    wherein said ethyl alcohol has a concentration of 0.01%-0.03% v/v,
    wherein said ethyl alcohol reaches the brain of the subject to induce a transient opening of the blood-brain barrier so that a homogeneous distribution of the non-BBB permeable substance reaches the brain of the subject, then the blood-brain barrier is restored to normal, blocking the non-BBB permeable substance from entering the brain.

* * * * *